United States Patent Office 3,311,515
Patented Mar. 28, 1967

3,311,515
THIXOTROPIC, NON-FLOWING ADHESIVE BOND-
ING AND JOINTING COMPOSITIONS AND
METHODS OF BONDING CERAMIC TILES TO
SUBSTRATES USING THIXOTROPIC, NON-FLOW-
ING ADHESIVE BONDING AND JOINTING
COMPOSITIONS
Ernest E. Weller, Sayreville, and Robert J. Kleinhans,
Highland Park, N.J., assignors to Tile-Council of America, Inc., New York, N.Y., a corporation of New York
No Drawing. Filed Oct. 18, 1963, Ser. No. 317,151
18 Claims. (Cl. 156—71)

This invention relates to polyamido-amine epoxy resin compositions and more particularly to such compositions capable of conversion into insoluble, infusible products which may be rendered thixotropic and non-flowing while curing by the addition of a polyamido-amine-water gel hardener. In one of its aspects the invention relates to novel epoxy resin compositions which are made thixotropic and non-flowing without the addition of filler materials. In another aspect it relates to improvement in covering substrate with ceramic tile and the like, and to improved epoxy resin compositions which provide strong firm bond between the substrate and tile, and strong, firm, crack-free and flexible joints between the tiles.

The usefulness of epoxy resin compositions is universally recognized and the applications therefore are literally too numerous to mention. Despite their wide acceptance, when conventional epoxy resin compositions are used as adhesives, as caulking or sealing materials, as filleting materials, as coatings or for many other applications, they have a tendency to flow or sag with time. This characteristic limits the usefulness of epoxy compositions where it is desired to build up specific thickness of material or to adhere various components to vertical surfaces where clamping means are not available.

It has been suggested by others to impart flow resistance and non-sagging properties to such compositions by the addition of finely divided inert solids, e.g., fillers, pigments, etc., as well as reactive and non-reactive extenders. This technique is used with both high and low viscosity grades of epoxy resins.

The resulting blends, however, have several disadvantages: (1) the additives described increase the viscosity of the composition, thereby making it more difficult to mix in the required hardening agents, (2) the increased viscosity makes it more difficult to apply the composition and clean up afterwards, (3) increased viscosity does not actually prevent flow or sag of these compositions but merely retards it for a period of time that may not be long enough to allow sufficient hardening, (4) increased viscosity is only a room temperature effect and increasing temperatures resulting from exothermic curing reactions or attempts to accelerate curing by addition of heat will usually cause a reduction in viscosity and flow out or sag of the epoxy resin composition.

It is an object of the present invention to provide epoxy resin compositions that will harden into insoluble, infusible products which are substantially free, during cure, of the deleterious sag and flow properties discussed hereinabove and inherent in conventional epoxy resin compositions.

It is a further object of the present invention to provide epoxy resin compositions which may be emulsified in and readily removed by water.

A further object of the present invention is to provide a method for setting and grouting tile with the improved epoxy resin compositions disclosed herein.

Other objects of the invention will in part be clear and will in part be obvious from the following description.

It has been discovered that the addition of small amounts of water, and in some cases glycerine, to certain polyamido-amine epoxide hardener agents produces a gel-like structure in the composition which is extremely stable during storage. It is not necessary to add fillers to the polyamido-amine curing agent to obtain the gel-like structure, though the addition of such fillers will not ordinarily inhibit formation of the gel.

The resultant polyamido-amine gel is capable of being completely and intimately mixed with suitable epoxide resin compositions to produce compositions which are thixotropic and free from deleterious flow and sag properties, and then to co-react with said epoxide resin compositions so as to cause them to harden into insoluble, infusible products.

It has also been discovered that the addition of water, and in some cases glycerine, to certain epoxide resin compositions to which have first been added certain polyamido-amine hardener agents, produces compositions which are thixotropic and free from deleterious flow and sag properties. The addition of fillers to either the polyamido-amine hardener agent or the epoxide resin composition is not necessary to obtain these results. The hardening of said composition is in no way inhibited by the addition of said components.

The polyamido-amine epoxide hardeners capable of being gelled as described in this invention are produced by copolymerization of polyamines with polycarboxylic acids, the copolymerization reaction being permitted to proceed to such an extent that the products are soluble in small amounts of water, on the order of up to about 20% based on the weight of copolymer and are soluble in epoxy resin in all proportions. According to this invention, such copolymerization products may be gelled by the addition of water in excess of about 5 percent and less than about 50 percent, based on the weight of the copolymer. Preferably, the gels are formed by the addition of 15 to 30 percent by weight of water, based upon the weight of the polyamido-amine. Glycerine in about the same amount may also be used as the gelling agent. The preferred gelling agent however is water.

In conducting the copolymerization reaction, it is important that excess polyamine be used, so that unreacted polyamine is present in the resulting copolymer. In the case where no unreacted amine remains, ability to gel, as well as water solubility, is lost and the products do not possess the required ability to harden an epoxide polymer.

Suitable polyamido-amine hardeners are prepared by reacting the polyamine and polycarboxylic acids described herein at temperatures below the decomposition temperature of the polyamines by employing the appropriate polyamine in stoichiometric excess of that theoretically required to react with the appropirate polycarboxylic acid. The temperature of the reaction is preferably between 100° and 200° C. Especially good results are achieved when the temperature is between about 120° C. and 160° C.

Aliphatic polyamines containing two or more amino nitrogens may be used to produce such polyamido-amine hardeners. Polyamines containing primary nitrogens are especially suitable.

Polyamines suitable for making the polyamido-amine compounds disclosed herein have the formulae:

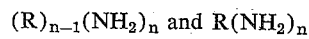

Where R is a hydrocarbon radical and $n$ is an integer having a value of at least 2, and preferably between about 4 and 10, such polyamines should have a formula weight of at least 60 and preferably between about 90 and 500.

Examples of polyamines that may be used to produce such hardeners include ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines satisfying the above formulae such as alkyl polyamines in which the alkyl group is butyl, hexyl, octyl and so forth. The hydrocarbon radical R attached to the amino nitrogen atom may have up to 50 carbon atoms or more. Preferably, however, the hydrocarbon radical has fewer than about 30 carbon atoms.

Especially suitable are polyamines which have a value of $n$ of at least 4, or polyamines wherein the formula weight of R is greater than about 90. It has been found that where polyamines are used in which $n$ is an integer less than 4, or R is of a molecular weight lower than 90, satisfying hardening action is not obtained. This is believed to be due in part to the reaction of such low molecular weight polyamines with polycarboxylic acids to form compounds having a high melting point, which compounds require high reaction temperature, e.g., above the decomposition temperature of the polyamines, to effect the fusion which precedes the amidation reaction. The same problems are experienced when, for example, a polycarboxylic acid, e.g., $R(COOH)_2$, is employed wherein R is of low molecular weight. A further difficulty found to exist when low molecular weight polyamines and polycarboxylic acids are used is that the reaction products produced are insoluble in epoxide polymers and therefore are not able to function as hardeners.

The polycarboxylic acids suitable for reaction with the above-described polyamines to produce the polyamidoamine epoxide hardeners have at least two carboxyl groups and may be represented by the formula $R(COOH)_n$, where R is a hydrocarbon radical which may be saturated or unsaturated, aliphatic, cycloaliphatic, or heterocyclic, and $n$ is an integer having a value of at least 2. Among the preferred polycarboxylic acids are the straight chained saturated dicarboxylic acids such as adipic, pimelic, suberic, azeloic, sebacic, nonone dicarboxylic acid, and the higher members of this series, including mixtures thereof. Also may be mentioned the straight chained unsaturated dicarboxylic acids, including citraconic acid, mesaconic acid and itaconic acid. Especially suitable for use are the so called resin acids. These may be classified as diterpene acids, a major constituent being abietic acid. When such diterpene acids are dimerized, a dicarboxylic acid results. Particularly useful are those diterpene acids which, upon being dimerized, have a formula weight of about 300 to 900, and preferably between about 500 to 600.

The polyamido-amine epoxide hardeners are produced by dissolving the polycarboxylic acid and polyamine in a suitable organic solvent, in which the polyamine and the polycarboxylic acid are soluble. The amount of the polyamine is in excess of that stoichiometrically required to react with the polycarboxylic acid. The amount of excess polyamine is preferably at least about 5 percent and may be between 5 and 200 percent, or higher, and preferably between 50 and 150 percent, based on the polycarboxylic acid. The solvent employed is not critical, since after mixing the solvent is preferably removed, for example, by evaporation. The residue remaining after solvent evaporation is then heated to a temperature of between about 100° to 200° C., care being taken that the temperature employed is below the decomposition temperature of the polyamine used. The time of heating should be at least about one-half hour, or between about 1 and 25 hours, and is preferably between 1 and 16 hours. Although the solvent is preferably removed prior to heating, it should be understood that the solvent may also be removed after heating.

The preferred polyamido-amine epoxide hardeners described hereinabove, when gelled as described herein, can be readily reacted with epoxy resins to produce adhesive compositions which cure readily to a strong, firm bond, are readily cleanable by water before cure, and are substantially free of deleterious flow and sag properties during cure.

The resinous epoxides suitable for use in the present invention comprise those compounds having at least two epoxy groups, i.e., at least two

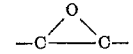

groups. The polyepoxides may be saturated or unsaturated, aliphatic, cycloaliphatic, or heterocyclic and may be substituted if desired with substituents such as chlorine atoms, hydroxyl groups, ether radicals, and the like. They may also be monomeric or polymeric.

Examples of the polyepoxides include, among others, epoxidized, glycerol dioleate, 1,4-bis (2,3-epoxypropoxy) benzene, 1,3-bis (2,3-epoxypropoxy) benzene, 4,4'-bis (2,3-epoxypropoxy) diphenyl ether, 1,8-bis (2,3-epoxypropoxy) octane, 1,4-bis (2,3-epoxypropoxy)-cyclohexane, 4,4'-bis (2-hydroxy-3,4'-epoxybutoxy)-diphenyldimethyl-methane, 1,3-bis (4,5-epoxypentoxy)-5-chlorobenzene, 1,4-bis (3,4-epoxybutoxy)-2-chlorocyclohexane, 1,3-bis (2-hydroxy-3,4-epoxybutoxy) benzene, 1,4-bis and (2-hydroxy-4,5-epoxypentoxy) benzene.

Among the preferred epoxides are the epoxy polyethers of polyhydric phenols obtained by reacting a polyhydric phenol with a halogen containing epoxide or dihalohydrin in the presence of an alkaline medium. Polyhydric phenols that can be used for this purpose include, among other, resorcinol, catechol, hydroquinone, methyl resorcinol, or polynuclear phenols, such as 2,2-bis (4-hydroxyphenyl) propane (Bisphenol A), 2,2-bis (4-hydroxyphenyl) butane, 4,4'-dihydroxybenzophenone, bis (b-hydroxyphenyl) ethane, 2,2-bis (4-hydroxyphenyl) pentane, and 1,5-dehydroxynaphthalene. The halogen-containing epoxides may be further exemplified by 3-chloro-1, 2-epoxybutane, 3-bromo-1, 2-epoxyhexane, 3-chloro-1, 2-epoxyoctane and the like.

The monomer products produced by this method from dihydric phenols and epichlorohydrin may be represented by the general formula:

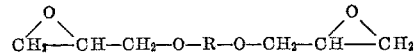

wherein R represents a divalent hydrocarbon radical of the dihydric phenol. The polymeric products will generally not be a single simple molecule but will be a complex mixture of glycidyl polyethers of the general formula:

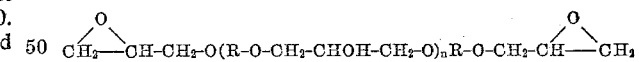

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforesaid glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range from 50° C. to 150° C. The heating is continued for several hours to effect the reaction, and the product is then washed free of salt and base.

These epoxide resins are available in several forms varying from a viscous liquid to a solid resin. Especially suitable are those resins which are liquid or near their softening point at room temperature.

Typical of the epoxy resins which may be employed are the epichlorohydrin-bis phenol type sold under the trade names "Epon Resins," "Gen-Epoxy," "DER Resin," "Araldite," "ERL Resin," "Epi Rez"; and the trifunctional epoxy compounds sold under the trade name "Epiphen." An example of the trifunctional type of compounds is "Epiphen ER-823," which has the following formula:

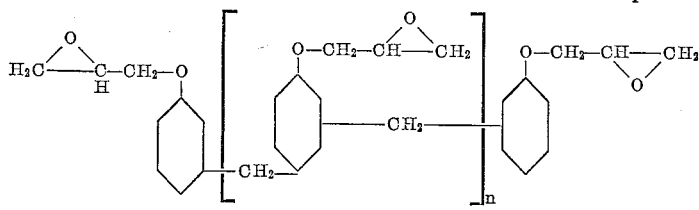

where $n$ is a number such that from about 180 to 200 grams of the resin contain about one gram mole of epoxide group.

Inert, finely divided solid fillers up to about 400 percent, and preferably up to about 300 percent, by weight, based on the weight of the epoxy resin, may be added to the epoxide resins suitable for use in the present invention.

Where it is desirous to take advantage of the epoxide resin with a gel-like structure according to our pending patent application Ser. No. 140,660 now U.S. Patent No. 3,212,946, the epoxide resin should contain between about 5 and 400 percent and preferably between about 10 and 300 percent by weight, based on the weight of epoxy resin, of an inert, finely divided solid. The water required to produce the gel structure may vary between about 0.5 and 15 percent by weight of the epoxy resin.

The epoxide resins and/or polyamido-amine hardeners may contain up to about 500 percent and preferably between about 10 and 300 percent, by weight, based on the weight of epoxy resin, of an inert, finely divided solid.

Suitable finely divided inert solid materials for use in the present invention include fillers, such as asbestos, albalith, silica, mica, flint powder, quartz, Kryolite, Portland cement, limestone, atomized alumina, barytes, talc, pyrophyllite, various clays, diatomaceous earth, and other like materials. Also may be mentioned pigments, such as titanium dioxide, cadmium red, carbon black, aluminum powder and the like.

Suitable other colorants, too numerous to list, may be added to the epoxy resin if desired. The color materials should be selected, however, so as to be non-reactive with the epoxy resins and other ingredients at atmospheric temperature, as otherwise this might cause poor storage stability and also effect the retention of adhesiveness.

The finely divided inert solid materials suitable for use herein may have an average particle size ranging between about 50 mesh and 400 mesh, and preferably between about 100 and 400 mesh (U.S. Std. Series). The exact size of the inert finely divided solid materials will depend upon the particular application of the composition.

In addition to finely divided solid materials, a wide variety of resinous modifiers may be added to the epoxy resin systems disclosed herein. Among these may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols, and which may contain free carboxyl groups and/or aliphatic hydroxyls capable of reacting with the epoxy resins; vinyl resins such as vinyl chloride, vinylidene chloride, and the like; isocyanate resins (polyurethanes), characterized by the extremely reactive —N—C—O radical, which is capable of reacting with hydroxyl groups present in the epoxy resin chain, typical of which are the monomeric diisocyanates, such as tolylene diisocyanate, diphenyl methane 4,4'-diisocyonate, and 3,3'butolylene 4,4'-diisocyanate, fluorocarbon resins, such as polytetrafluoroethylene, polytrifluoromonochoroethylene, and the like, and silicone resins. The addition of such resinous modifiers is well understood in the art. The resinous modifiers may vary from about 1 to about 100 percent or more, by weight, based on the weight of the epoxy resin.

An especially suitable resinous modifier for use in the present invention is polystyrene resin, and this resinous modifier is preferred. The polystyrene resin should vary from about 10 to 50 percent and preferably from about 20 to 40 percent, by weight, based on the weight of the epoxy resin. Polystyrene resin, it has been discovered, considerably enhances the flexibility of the bonds produced with the epoxy resin compositions disclosed herein.

Specific examples embodying the teachings set forth above are here given by way of exemplification and not restriction.

EXAMPLE 1

A polyamido-amine curing agent having an amine number of 410 to 450, a viscosity of 2–5 poises at 80° F., a weight of 7.91 lb. per gallon and an equivalent reactive weight of 140 to 144 grams was used in this example. This curing agent was purchased under the trade name of EM-308. One gram of water was mixed with 10 grams of the curing agent. The resultant mixture gave off heat. Two additional grams of water were added to the solution with further heat (140° F.) being evolved and a gel was formed which was remarkably stable upon storage.

EXAMPLE 2

A liquid epoxide resin of the epichlorohydrin bisphenol of acetone type (Epon 828) having a viscosity at 25° C. of 100–160 poises and an epoxide equivalent of 180–195 was used in this example.

(a) The 13 grams of gelled curing agent of Example 1 were mixed with 20 grams of said epoxy resin. The mixture exhibited some gel-like properties and resisted flow on a vertical surface. The mixture cured to a satisfactory opaque polymeric solid overnight.

(b) Ten grams of the polyamido-amine hardener described in Example 1, to which no water had been added, were mixed with 20 grams of said epoxy resin. The resulting mixture was free flowing and exhibited no resistance to flow when coated on a vertical surface.

(c) A mixture of 10 grams of polyamido hardener and 20 grams of epoxy resin was prepared. To this mixture 3 grams of water were added slowly with mixing. The resulting mixture exhibited gel-like properties similar to those exhibited in mixture (a) and resisted flow when coated on a vertical surface.

EXAMPLE 3

A polyamido-amine curing agent having a viscosity of 150–400 centipoises at a specific gravity of 0.94–0.96 and an equivalent reactive weight of approximately 90 grams was used in this example. This curing agent was purchased under the trade name Epi-Cure-855.

The following solutions were prepared:

(a) 50 weight parts of polyamido-amine hardener and 10 weight parts of water.

(b) 50 weight parts of polyamido-amine hardener and 15 weight parts of water.

When water was mixed with the polyamido-amine hardener to prepare the above-noted solutions, heat was evolved in all cases. Both solutions (a) and (b) became gel-like.

Twelve weight parts of solution (a) and thirteen weight parts of solution (b) were each mixed with 20 weight parts of the epoxide resin described in Example 2. Each resulting mixture exhibited gel-like properties and resisted flow when coated on a vertical surface. The mixtures cured to satisfactory, opaque polymeric solids overnight.

Solutions (a) and (b) above were then allowed to shelf age. After shelf aging for 1, 3 and 6 months, hardener solutions (a) and (b) were mixed in the above-noted proportions with the epoxide resin described in Example 2. No noticeable change could be found in the gel-like properties of the hardener solutions after each period of aging and the resulting hardener-epoxide resin mixtures all exhibited gel-like properties similar to those found when the solutions were initially prepared and then mixed with the epoxide resin. In all cases the mixtures resisted flow when coated on a vertical surface and cured to satisfactory, opaque polymeric solids overnight.

EXAMPLE 4

A polyamido-amine curing agent having a viscosity of 750 centipoises at 77° F., a specific gravity of 0.96 and a reactive equivalent weight of 91.2 was used in this example. This curing agent was purchased under the trade name of Lancast A.

As in Example 1, 10 grams of the polyamido-amine hardener described above was mixed with 1 gram of water. Heat was evolved. Upon the addition of 2 more grams of water further heat was evolved and gel-like characteristics were formed.

The gel-like structure herein obtained was extremely stable on aging as was found for the polyamido-amine hardeners used in Examples 1 and 3.

EXAMPLE 5

Hardener and resin portions suitable for use in setting and grouting ceramic tile were made as follows:

*Resin portion*

| | Percent |
|---|---|
| Epoxide resin (as described in Example 2) | 30 |
| Polystyrene resin | 10 |
| TiO$_2$ (Rutile Pigment Grade) | 20 |
| Barytes | 40 |

The above components were mechanically mixed to a smooth consistency.

*Hardener portion*

| | Percent |
|---|---|
| Polyamido-amine (as described in Example 1) | 29 |
| TiO$_2$ (Rutile Pigment Grade) | 6 |
| Barytes | 44 |
| Super fine silica (300–400 mesh) | 12 |
| 15 micron silica | 9 |

The above components were mechanically blended to a smooth, lump-free consistency.

(a) To 200 grams of the resin portion above was added 100 grams of the hardener portion described above. A viscous mass which exhibited no gel-like properties resulted.

(b) Two grams of water were added to 100 grams of the hardener portion. A slight gel resulted. When this mixture was then added to 200 grams of the above-described resin portion, a mixture which exhibited some resistance to flow on vertical surfaces and exhibited other gel-like properties resulted.

(c) Five grams of water were added to 100 grams of the above hardener portion. This formed an easily broken but reformable firm gel. Gel-like properties were exhibited in the mixture resulting when the hardener portion was mixed with 200 grams of the above-described resin portion.

1.5 parts by weight of the described resin portion were mixed with 1.0 parts by weight of the described hardener portion, to which has been added 15% by weight of water based on the weight of the polyamido-amine hardener. A gelled but easily spreadable composition was produced. The composition was spread over a vertical wall surface to which was adhered glazed ceramic tiles in spaced relation. The joints between the tiles were thus filled with this grouting composition. Excess material was removed from the face of the tiles by scraping with a trowel edge and then wiped clean with a water-soaked cotton cloth. A smooth, hard impermeable grout joint was thus obtained which exhibited good flow resistance and non-sagging properties before final cure was realized.

EXAMPLE 6

This example illustrates the effect of varying the quantity of water added to filled epoxide hardeners of the type described.

A resin portion and hardener portion for use in this experiment consisted of the following formulae:

*Resin portion*

| | | |
|---|---|---|
| Epoxide resin (as described in Example 2) | lb | 19$^{15}/_{16}$ |
| Blue tinting agent | grms | 3 |
| Polystyrene resin (Picco A-5) | lb | 6 |
| TiO$_2$ (rutile pigment grade) | lb | 13$^{3}/_{16}$ |
| Barytes | lb | 26$^{1}/_{16}$ |

*Hardener portion*

| | | |
|---|---|---|
| Polyamido-amine (described in Example 1) | lb | 12$^{12}/_{16}$ |
| TiO$_2$ rutile type pigment grade | lb | 3$^{7}/_{16}$ |
| Barytes | lb | 18$^{3}/_{16}$ |
| 300 mesh fine white silica | lb | 5$^{3}/_{16}$ |
| 15 micron silica | lb | 4 |

The materials used in each portion were combined with good mechanical mixing and high shear action to obtain smooth pigment in liquid dispersions.

From the above resin and hardener portions 6 mixtures were prepared wherein water additions to the hardener portion equaled 0, 10, 20, 30, 40, and 50% based on the amount of reactive polyamido amine present. Data concerning gel properties, cure time, flow properties or ability to support the weight of a tile on a vertical surface, shrinkage and hardness were collected and are shown below.

| Percent Water Addition | Cure Time (Initial Gel) | Wall Sag (in.) | Percent Shrinkage, 7 days | Ames Hardness, 14-day cure |
|---|---|---|---|---|
| 0 | 16 hrs., 15 min | $^{3}/_{16}$ | 0.05 | 86 |
| 10 | 10 hrs., 45 min | 0 | 0.05 | 66 |
| 20 | 9 hrs., 30 min | 0 | 0.08 | 52 |
| 30 | 9 hrs., 30 min | 0 | 0.08 | 45 |
| 40 | 9 hrs., 0 min | 0 | 0.10 | 27 |
| 50 | 8 hrs., 45 min | 0 | 0.11 | 4 |

It may be seen from the above table that cure time and sag properties are affected most. Shrinkage shows a slight increase which does not appear detrimental. Ames hardness appears to be affected drastically but careful examination indicates a flexibility due to a cellular structure built into the polymer because of the water additions. Scratch hardness of a qualitative type shows surface hardness or mar resistance to be almost equal. Flexibility of the type seen here can be an aid in large expanses of ceramic tile and would eliminate the need for troublesome expansion joints.

From the table it can be seen that a most important property-cure time in a thin layer, is accelerated markedly by addition of water and offers tremendous advantages.

EXAMPLE 7

A polyamido-amine hardener was prepared by dissolving 14.6 parts by weight of adipic acid in 100 parts by weight of ethyl alcohol and to this mixture was added 40.0 weight parts of N-octadecene tri methylene diamine (a 100% stoichiometric excess of the amine). After solution was effected, the resulting mixture was heated to evaporate the alcohol, then placed for 16 hours in an oven held at 120° C. Upon cooling an orange-brown paste was obtained. The polyamido-amine hardener was then mixed with 50% of its weight of water and a gelatinous solution resulted.

EXAMPLE 8

An epoxide derived from an ortho-cresol-formaldehyde novalak which is reacted with epichlorohydrin to form a polyepoxide whose epoxide functionality is 2.7 and epoxide equivalent weight is 200 was purchased under the trade name Kopox 357 and was used as follows.

To 100 weight parts of the epoxide was added an equal weight of the curing agent of Example 7 to which had been added 25 weight parts of water and which was in a gelatinous form. Upon mixing good resistance to flow was observed and after about 18 hours a hard, opaque yellowish brown polymer resulted.

EXAMPLE 9

Liquid N-tallow bis (amino-propyl) amine was used in this example. This is a product commercially supplied under the trade name XC–95.

To 10 weight parts of liquid N-tallow bis (amino-propyl) amine was added 5 weight parts of glycerine. A stiff gel-like material was formed, which, however, could be easily mixed.

Fifteen weight parts of the resultant gel was then mixed with 20 weight parts of a liquid epoxy resin having an epoxide equivalent of 190–210.

The mixture exhibited gel-like properties and resisted flow and sag when trowelled over a vertical surface. The mixture cured to an opaque polymeric solid after about 20 hours.

EXAMPLE 10

A flexible form of this thixotropic system was prepared as follows, using a flexible liquid epoxy having a viscosity at 25° C. of 3500 cps., an Epoxy Value, Eq/100 gm. of 0.26 and specific gravity of 1.13 at 25°C./25° C. This resin was purchased under the trade name Araldite DP–437.

| | Weight parts |
|---|---|
| Epoxy-Araldite DP–437 | 20.00 |
| Epon 828 | 10.22 |
| Polystyrene | 9.10 |
| $TiO_2$ | 19.95 |
| Barytes | 39.51 |

These materials were mixed with good mechanical shear to a smooth, lump-free paste. At this point the whole mass was gelled by the addition of 1.22 weight parts water bringing the total to 100 weight parts.

The hardener for use with this resin was as follows:

| | Weight parts |
|---|---|
| Polyamido amine (EM 308) | 29.00 |
| $TiO_2$ | 7.84 |
| Barytes | 41.54 |
| Silica flour | 21.62 |

The hardener portion was gelled by the addition of 5 weight parts of water to 100 weight parts of the hardener portion.

1.0 parts by weight of the resin portion were mixed with 1.0 parts by weight of the gelled hardener portion. The gelled epoxide resin composition was then extruded from a caulking gun into a gap between the edges of two vertically positioned sections of gypsum wallboard. The epoxide composition did not flow or sag after extrusion and cured to a rubber consistency overnight.

EXAMPLE 11

The following example will illustrate the heat stability of the thixotropic gel properties developed by the invention disclosed herein as compared to the mere increase in room temperature viscosity resulting when only fillers are added to an epoxide resin in an effort to eliminate deleterious flow and sag or when thixotropy is obtained through means disclosed in the above-mentioned co-pending application Ser. No. 140,660, now U.S. Patent No. 3,212,946.

A resin portion and hardener portion for use in this example consisted of the following formulae:

Resin portion

| | Percent |
|---|---|
| Epoxide resin (as described in Example 2) | 30.22 |
| Polystyrene resin (Picco A–5) | 9.10 |
| $TiO_2$ | 19.95 |
| Barytes | 39.51 |
| Water | 1.22 |

Hardener portion

| | Percent |
|---|---|
| Polyamido amine (as described in Example 1) | 29.00 |
| $TiO_2$ | 7.84 |
| Barytes | 41.54 |
| Super fine silica (300–400 mesh) | 12.54 |
| 15 micron silica | 9.08 |

The materials used in each portion were combined with good mechanical mixing and high shear action to obtain smooth pigment in liquid dispersions.

To 5 samples of the above hardener portion water additions were made in 10% increments based on the amount of polyamido-amine present in the hardener.

Hardenable resin compositions were then prepared by mixing 150 weight parts of the above-described resin portion with 102.9 to 114.5 weight parts of water containing hardener portion, 100 weight parts of hardener portion being the above-described hardener portion. An additional sample was prepared by mixing 150 weight parts of resin portion with 100 weight parts of hardener portion to which no additional water had been added.

Each sample of mixed epoxide composition was then trowled on gypsum wallboard with a ³⁄₃₂" U-notched trowel. Tile pieces (2″ x 2″ ceramic mosaics) were then set in a portion of the troweled epoxide composition and then the assembly was vertically positioned in a 100° C. oven.

The following results were obtained:

| Percent Water Addition to Hardener | Ribs Formed by Trowel | Tile |
|---|---|---|
| No Water Addition | Sag | Tile slid off. |
| 10% Water Addition | No sag | No sag. |
| 20% Water Addition | do | Do. |
| 30% Water Addition | do | Do. |
| 40% Water Addition | do | Tile slid off. |
| 50% Water Addition | do | Do. |

What is claimed:

1. A thixotropic, non-flowing adhesive bonding and jointing composition comprising:
   (1) a liquid epoxy resin having terminal epoxy groups, and
   (2) a polyamido-amine gel hardener, said polyamido-amine being the reaction product of a polycarboxylic acid and a stoichiometric excess of a polyamine, said gel being obtained by adding to said polyamido-amine between 5 and 50% by weight, based on the polyamido-amine, of a member selected from the group consisting of water and glycerine.

2. The composition of claim 1 wherein said member is water and is present in an amount between about 15 and 30% by weight based on the reactive polyamido-amine.

3. The composition of claim 1 wherein the epoxy resin has incorporated therein a finely divided inert solid material.

4. A method of making a thixotropic, non-flowing adhesive bonding and jointing composition which comprises mixing:

(1) a polyamido-amine gel epoxy resin hardener composition, said polyamido-amine being the reaction product of a polycarboxylic acid and a stoichiometric excess of a polyamine, said polyamido-amine gel being obtained by adding to said polyamido-amine between about 5 and 50% by weight, based on the polyamido-amine, of a member selected from the group consisting of water and glycerine, and (2) an epoxy resin having terminal epoxy groups.

5. The method of claim 4, wherein the epoxy resin has incorporated therein a finely divided inert solid material and said member is water and is present in an amount between about 15 and 30% based on the polyamido-amine.

6. The method of claim 4, wherein the polyamido-amine epoxy resin hardener composition has incorporated therein a finely divided inert solid material.

7. A method of coating a substrate with tile, which comprises:
(1) covering the substrate with a thixotropic, non-flowing adhesive bonding composition formed by admixing an epoxy resin having terminal epoxy groups and a polyamido-amine gel epoxy resin hardener composition, said polyamido-amine being the reaction product of a polycarboxylic acid and a stoichiometric excess of a polyamine, said polyamido-amine gel being obtained by adding between about 5 and 50% by weight, based on said polyamido-amine, of water to said polyamido-amine,
(2) pressing tile into said adhesive bonding composition, and
(3) curing the composition to produce a firm bond between the substrate and tile.

8. The method of claim 7, wherein the epoxy resin has incorporated therein a finely divided inert solid material.

9. A method of coating a substrate with ceramic tile in which the ceramic tile is spacedly adhered to the substrate, which comprises:
(1) preparing a thixotropic and non-sagging adhesive bonding composition by mixing a first component comprising a polyamido-amine gel epoxy resin hardener, said polyamido-amine being the reaction product of a polycarboxylic acid and a stoichiometric excess of a polyamine, said polyamido-amine gel hardener being obtained by adding to said polyamido-amine about 5 to 50% by weight, based on the weight of said polyamido-amine, of water, and adding said polyamido-amine gel hardener to an epoxy resin having terminal epoxy groups,
(2) filling the spaces between said ceramic tiles with said adhesive bonding composition,
(3) removing the excess material from surface of said ceramic tile, and
(4) curing the composition to produce a hard, crack-free joint between said ceramic tiles.

10. The method of claim 9, wherein the polyamido-amine water composition has incorporated therein a finely divided inert solid material.

11. A method of claim 9, wherein the excess material is removed from the surface of said ceramic tile by cleaning with water.

12. A polyamido-amine gel composition suitable for use as an epoxy resin hardener which comprises a polyamido-amine, said polyamido-amine being the reaction product of a polycarboxylic acid and a stoichiometric excess of a polyamine, and 5 to 50% by weight, based on weight of said polyamido-amine, of a member selected from the group consisting of water and glycerine.

13. The composition of claim 12, wherein the water is present in an amount of between about 15 and 30% by weight of the polyamido-amine.

14. The composition of claim 12, which includes a finely divided inert solid materal.

15. The composition of claim 14, wherein the water is present in an amount of between about 15 and 30 percent by weight based on the reactive polyamido-amine.

16. A method of making a polyamido-amine gel composition suitable for use as an epoxy resin hardener in an epoxy resin adhesive bonding composition, wherein said polyamido-amine is the reaction product of a polycarboxylic acid and a stoichiometric excess of a polyamine, which comprises adding to said polyamido-amine between 5 and 50% by weight, based on weight of said polyamido-amine and in sufficient amount to form a gel, of a member selected from the group consisting of water and glycerine.

17. A method of coating a substrate with tile in which the tiles are spacedly adhere to the substrate, which comprises preparing an adhesive bonding composition by mixing two components, one of said components comprising an epoxy resin, and the second of said components comprising a polyamido-amine gel epoxy resin hardener, said polyamido-amine gel being obtained by adding to said polyamido-amine from about 5 to 50% by weight, based on weight of said polyamido-amine, of water; the amount of water being sufficient to produce a gel-like structure in said polyamido-amine; filling the spaces between the tiles with the resulting adhesive bonding composition and curing the composition to produce a hard, crack-free joint between the tiles.

18. A two-component system adapted to be mixed to produce an adhesive resin bonding composition which is resistant to flow and sag during hardening, which comprises as the first component an epoxy resin and as a second component a polyamido-amine gel epoxy resin hardener, said polyamido-amine being the reaction product of a polycarboxylic acid and a stoichiometric excess of a polyamine, said polyamido-amine gel hardener being obtained by adding to a polyamido-amine about 5 to 50% by weight of water, based on weight of said polyamido-amine, the amount of water being sufficient to produce a gel-like structure in said polyamido-amine.

References Cited by the Examiner
UNITED STATES PATENTS

| | | | |
|---|---|---|---|
| 2,811,495 | 10/1957 | Wittcoff et al. | 260—18 |
| 2,935,488 | 5/1960 | Phillips et al. | 260—836 |
| 3,212,946 | 10/1965 | Weller et al. | 156—71 |
| 3,242,116 | 3/1966 | Becker et al. | 156—330 X |

EARL M. BERGERT, Primary Examiner.

HAROLD ANSHER, Examiner.